2,980,629

GEL-FREE ROSIN SOAP AND METHOD OF PREPARING SAME

Charles M. Lambert, New London, Pa., assignor to Hercules Powder Company, Wilmington, Del., a corporation of Delaware No Drawing. Filed Sept. 13, 1957, Ser. No. 683,697

12 Claims. (Cl. 252—369)

This invention relates to liquid rosin soaps and to methods of preparing same.

For many years, the potassium and sodium soaps of rosin have been prepared at solids and acid number levels which yield varying proportions of a gel phase and a liquid or gel-free phase. On prolonged storage these phases tend to separate into layers having solids and acid number properties different from the original values and even more different from each other. The use of either of these separate phases in (e.g.) emulsion polymerization results in erratic polymerization rates. The tendency to separate is increased at higher temperatures, so that drums stored warm frequently contain separated material, and separation may even be initiated during transit in tank cars under appropriate conditions.

In the course of a continuing program to improve the physical properties of rosin soaps for use in the synthetic rubber industry, and particularly, to suppress gel formation and therefore reduce viscosity, various changes in solids content and in acid number have been made and various materials added. While some of these changes and/or additions reduced gel content, they were not effective to completely eliminate same and to provide a rosin soap which could be shipped and stored for long periods without gel formation.

A principal object of the invention, therefore, is the provision of a liquid gel-free rosin soap which may be shipped and stored for long periods of time without gel formation and a method of making same.

It has now been discovered that if sodium chloride or potassium chloride is incorporated in a rosin soap and the solids content, salt content and acid number of the soap maintained within certain critical limits, such soap will be gel-free and will remain so for extended periods of time.

The following examples will serve to illustrate the invention.

Example 1

Disproportionated wood rosin (147 parts) was heated to the molten state and a combined mixture of 42.2 parts of potassium hydroxide, 3.2 parts of sodium chloride and 11.6 parts of diluting water added to the molten rosin under constant agitation. Water lost during the reaction was replaced, as necessary, to yield 204 parts of soap having the following characteristics:

Total solids _____percent__ 80
Acid number _____ 19.0
Free resin acids (calculated as abietic acid)
    percent__ 12
Sodium chloride (based on total solids) ____do____ 1.96
Water _____do____ 20

This soap was gel-free and showed no gel formation after storage at 20–25° C. for 13 months.

Example 2

A sodium soap of a disproportionated wood rosin having the following characteristics was prepared following the procedure of Example 1.

Total solids _____percent__ 77.0
Acid number _____ 25.0
Potassium chloride (based on total solids)
    percent__ 2.0

This soap was gel-free and showed no gel formation after storage at 20–25° C. for 5 months.

Example 3

A potassium soap of a mixture comprising 85% wood rosin and 15% disproportionated wood rosin having the following characteristics was prepared following the procedure of Example 1.

Total solids _____percent__ 80.0
Acid number _____ 17.5
Sodium chloride (based on total solids) percent ___ 1.95

This soap was gel-free and showed no gel formation after storage at 20–25° C. for 2.5 months.

The soaps of the invention may be described as all-liquid gel-free soaps consisting of potassium or sodium salts of resin acids in admixture with free resin, sodium or potassium chloride and water. Optimum results, in terms of homogeneity, are obtained if the sodium salt is used with the potassium soap and the potassium salt with the sodium soap and, hence, these compositions are preferred. However, quite satisfactory results are obtained when the sodium salt is used with the sodium soap and the potassium salt with the potassium soap and, hence, these compositions are also within the scope of the invention.

In order to attain the objectives of the invention, i.e., liquid gel-free soaps, the relative proportions of total solids, free resin acids as indicated by acid number, and salt content must be maintained within relatively narrow critical limits. The relative proportions of each will vary depending on the particular ingredients utilized in preparing the soaps. Thus, the total solids content and the relative proportions of soap to free resin acids will be found to vary as the type of rosin acids vary, and also as the saponifying metal alkali is varied. Thus, in the case of the potassium soaps of disproportionated rosin, it has been found that the acid number, salt content and total solids must be maintained within the following ranges to attain the objectives of the invention.

Acid number _____ 17–22
Salt content (based on total solids) _____ 1.8–2.0
Total solids _____percent__ 78–82

As the acid number decreases below 17, there is an increasing tendency toward gel formation and phase separation. For example, a potassium soap of disproportionated wood rosin having 80.2% total solids, 1.99% sodium chloride (based on total solids) and an acid number of 17.2 showed no gel formation at the end of a year, while similar soaps of the same age having acid numbers of 16.1 and 15.4 showed substantial gel formation and phase separation. Similarly, gel formation and phase separation occur as the total solids level is decreased below 78%. On the other hand, when the acid number and/or total solids are increased above 22 and 82%, respectively, crystallization occurs. The tendency toward gel formation and phase separation also increases rapidly as the concentration of salt is decreased below 1.8%. The upper limit of salt concentration is determined by the limit of solubility of the salt in the particular composition and will usually not exceed about 2.0%.

Within the ranges set forth above, optimum results are obtained when the acid number, salt content and total solids are maintained within the ranges 18–20 (acid number), 1.8–2.0% (salt content based on total solids) and 79–81% (total solids) and, hence, these ranges are preferred.

In the case of the sodium soaps of disproportionated rosin, the maximum operable and preferred ranges of acid number, salt content and total solids are as follows:

|  | Maximum Operable Range | Preferred Range |
| --- | --- | --- |
| Acid number | 22–26 | 23–25 |
| Salt content (based on total solids) | 1.8–2.0 | 1.8–2.0 |
| Total solids | 75–79 | 76–78 |

As in the case of the potassium soaps, gel formation and phase separation set in when the acid number and/or total solids are below 22 and 75% respectively, and crystallization occurs when the acid number and/or total solids are above 26 and 79% respectively. It will thus be seen that the ranges set forth are critical to obtain rosin soaps which are gel-free and which will remain so for extended periods of time.

In the preparation of the gel-free soaps of the invention, the alkali, salt and water may be combined to form an aqueous phase and the aqueous phase then added to the molten rosin with agitation as described in the examples. Alternatively, the molten rosin may be added to the complete aqueous phase, or the two phases may be brought together continuously in a mixing pump. In order to obtain the desired proportions of ingredients in the final product, it may be necessary to adjust the final weight of the soap with water to compensate for loss during the reaction.

The temperature of the reaction is not critical. When operating batchwise, the only requirement is that the rosin be kept molten. While it is desirable to melt the rosin to 150–160° C. to insure complete solution of any crystalline phase, fluidity can usually be maintained in an oil bath at 105–115° C. The saponification reaction, of course, is exothermic so that the problem becomes one of minimizing the water vapor loss and avoiding excessive foaming.

As a saponifying agent any potassium or sodium alkali such as potassium or sodium hydroxide, carbonate, etc., may be used. The preferred saponifying agents are potassium hydroxide and sodium hydroxide. The saponifying agent is advantageously employed in the form of an aqueous solution or slurry of a concentration such as to provide the desired acid number, i.e., free acid content and total solids content in the product. However, this is not essential since, if the acid number and total solids content of the product do not fall within the critical ranges required, adjustment to within these ranges may be made by reducing or increasing moisture, adding resin solids and/or adding acid or alkali, as the case may be.

The sodium and potassium salts of hydrochloric acid are unique in the process and product of the present invention. The salt is preferably added to the mixture to be saponified in an amount such as to provide a concentration of same in the product within the critical ranges hereinbefore defined. This is not essential, however, as part or all of the salt may be added to the saponified product.

The rosin soaps of the invention may be prepared from resin acids or any suitable resin acid containing material such as wood or gum rosin, tall oil rosin, and the like. Such rosin materials may be refined in any suitable manner, disproportionated, partially hydrogenated or otherwise treated to improve their stability and other properties. The preferred soaps are those prepared from disproportionated rosin or mixtures of disproportionated rosin with gum, wood or tall oil rosin. Disproportionation may be effected in any suitable manner as by a heat treatment in the presence of a catalyst such as iodine, sulfur dioxide, platinum and the like. A suitable method for effecting disproportionation is disclosed in U.S. 2,138,183 to Edwin R. Littmann.

It will thus be seen that the present invention provides a liquid gel-free rosin soap which retains its homogeneous character over long periods of time thereby obviating the difficulties previously encountered with soaps of this type when used, for example, in emulsion polymerization processes. While various details of the invention have been set forth for the purpose of illustration, the invention is not to be construed as limited thereby except as the same may be included in the following claims.

What I claim and desire to protect by Letters Patent is:

1. A liquid gel-free rosin soap selected from the group consisting of the potassium and sodium soaps of disproportionated rosin and mixtures of disproportionated rosin with other rosin materials, said soap containing a salt selected from the group consisting of sodium chloride and potassium chloride, said potassium soap having an acid number from about 17 to about 22, a total solids content from about 78% to about 82%, a water content from about 18% to about 22%, and a salt content from about 1.8% to about 2.0%, based on the total solids, and said sodium soap having an acid number from about 22 to about 26, a total solids content from about 75 to about 79%, a water content from about 21% to about 25%, and a salt content from about 1.8% to about 2.0%, based on the total solids.

2. A liquid gel-free rosin soap selected from the group consisting of the potassium and sodium soaps of disproportionated rosin, said soap containing a salt selected from the group consisting of sodium chloride and potassium chloride, said potassium soap having an acid number from about 17 to about 22, a total solids content from about 78% to about 82%, a water content from about 21% to about 25%, and a salt content from about 1.8% to about 2.0%, based on the total solids, and said sodium soap having an acid number from about 22 to about 26, a total solids content from about 75 to about 79%, a water content from about 21% to about 25%, and a salt content from about 1.8% to about 2.0%, based on the total solids.

3. A liquid gel-free potassium soap of disproportionated rosin containing a salt selected from the group consisting of sodium chloride and potassium chloride, said soap having an acid number from about 17 to about 22, a total solids content from about 78% to about 82%, a water content from about 18% to about 22%, and a salt content of from about 1.8% to about 2.0%, based on the total solids.

4. A liquid gel-free potassium soap of disproportionated rosin, said soap having an acid number from about 17 to about 22, a total solids content from about 78% to about 82%, a water content from about 18% to about 22%, and containing from about 1.8% to about 2.0%, based on the total solids, of sodium chloride.

5. A liquid gel-free potassium soap of disproportionated rosin, said soap having an acid number from about 17 to about 22, a total solids content from about 78% to about 82%, a water content from about 18% to about 22%, and containing from about 1.8% to about 2.0%, based on the total solids, of potassium chloride.

6. A liquid gel-free sodium soap of disproportionated rosin containing a salt selected from the group consisting of sodium chloride and potassium chloride, said soap having an acid number from about 22 to about 26, a total solids content from about 75% to about 79%, a water content from about 21% to about 25%, and a salt content of from about 1.8% to about 2.0%, based on the total solids.

7. A liquid gel-free sodium soap of disproportionated rosin, said soap having an acid number from about 22 to about 26, a total solids content from about 75% to about 79%, a water content from about 21% to about 25%, and containing from about 1.8% to about 2.0%, based on the total solids, of potassium chloride.

8. A liquid gel-free sodium soap of disproportionated rosin, said soap having an acid number from about 22 to about 26, a total solids content from about 75% to about 79%, a water content from about 21% to about 25% and containing from about 1.8% to about 2.0%, based on the total solids, of sodium chloride.

9. The process of forming a liquid gel-free rosin soap which comprises forming a mixture of (1) rosin, (2) a saponifying agent selected from the group consisting of sodium and potassium alkali, (3) a salt selected from the group consisting of sodium chloride and potassium chloride and (4) water, reacting the mixture to form a soap, and adjusting the acid number, total solids content and salt content such that the potassium soap has an acid number from about 17 to about 22, a total solids content from about 78% to about 82% and a salt content from about 1.8% to about 2.0%, based on the total solids, and the sodium soap has an acid number from about 22 to about 26, a total solids content from about 75% to about 79%, and a salt content from about 1.8% to about 2.0%, based on the weight of the solids.

10. A process in accordance with claim 9 in which the rosin is a disproportionated rosin.

11. A process in accordance with claim 10 in which the saponifying agent is potassium alkali and the salt is sodium chloride.

12. A process in accordance with claim 10 in which the saponifying agent is sodium alkali and the salt is potassium chloride.

References Cited in the file of this patent

UNITED STATES PATENTS

| | | |
|---|---|---|
| 2,249,766 | Humphrey | July 22, 1941 |
| 2,740,760 | Pilch | Apr. 3, 1956 |
| 2,842,453 | Anderson et al. | July 8, 1958 |

FOREIGN PATENTS

| | | |
|---|---|---|
| 348,689 | Great Britain | May 14, 1931 |
| 378,913 | Great Britain | Aug. 16, 1932 |

UNITED STATES PATENT OFFICE
CERTIFICATE OF CORRECTION

Patent No. 2,980,629                      April 18, 1961

Charles M. Lambert

It is hereby certified that error appears in the above numbered patent requiring correction and that the said Letters Patent should read as corrected below.

Column 4, line 37, for "21% to about 25%" read -- 18% to about 22% --.

Signed and sealed this 12th day of September 1961.

(SEAL)
Attest:

ERNEST W. SWIDER
Attesting Officer

DAVID L. LADD
Commissioner of Patents
USCOMM-DC